United States Patent

Rawlins

(10) Patent No.: US 6,216,183 B1
(45) Date of Patent: Apr. 10, 2001

(54) APPARATUS AND METHOD FOR SECURING INFORMATION ENTERED UPON AN INPUT DEVICE COUPLED TO A UNIVERSAL SERIAL BUS

(75) Inventor: Paul B. Rawlins, Spring, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/196,508

(22) Filed: Nov. 20, 1998

(51) Int. Cl.[7] .................................................. G06F 13/00
(52) U.S. Cl. ......................... 710/100; 710/129; 713/200; 713/202; 711/163
(58) Field of Search ..................... 710/100, 126, 710/129, 260, 62, 63, 64, 65, 36; 713/200, 201, 202, 300; 711/163, 164; 380/3, 25, 4

(56) References Cited

U.S. PATENT DOCUMENTS

| 5,630,057 | * | 5/1997 | Hait .................................. 713/200 |
| 5,748,888 | * | 5/1998 | Angelo ............................. 713/200 |
| 5,802,318 | * | 9/1998 | Murray et al. .................. 710/100 |
| 5,905,912 | * | 5/1999 | Story et al. ...................... 710/47 |
| 5,933,611 | * | 8/1999 | Shakkarwar .................... 710/126 |
| 5,963,142 | * | 10/1999 | Zinsky et al. ................... 340/825.34 |
| 6,038,320 | * | 3/2000 | Miller ............................... 380/44 |
| 6,067,589 | * | 5/2000 | Mamata ........................... 710/13 |
| 6,134,661 | * | 10/2000 | Topp ................................ 713/200 |
| 6,138,240 | * | 10/2000 | Tran et al. ....................... 713/202 |

* cited by examiner

Primary Examiner—Robert Beausoleil
Assistant Examiner—X. Chung-Trans
(74) Attorney, Agent, or Firm—Conley, Rose & Tayon; Kevin L. Daffer

(57) ABSTRACT

A computer system, bus interface unit and method are provided for securing passwords entered upon a USB input device, such as a USB keyboard. The bus interface unit includes a USB host controller coupled between a USB bus on which the keyboard is configured and another bus on which the system memory is operably connected. The host controller contains registers which keep track of target endpoint addresses of USB devices and, more specifically, address locations (i.e., an input/output address range of to-be-secured data) within those devices. Entry upon a keyboard which falls within the monitored, target endpoint address noted within the host controller will signal the host controller to initiate system management interrupt (SMI), and to execute SMI handler code attributed to SMI. Data from the secured (monitored) target address space is placed within a data buffer of the host controller and eventually to a secured location within system memory.

20 Claims, 4 Drawing Sheets

APPARATUS AND METHOD FOR SECURING INFORMATION ENTERED UPON AN INPUT DEVICE COUPLED TO A UNIVERSAL SERIAL BUS

BACKGROUND OF THE INVENTION

1. Field of the Invention

This invention relates to computer system security and, more particularly, to an apparatus and method for securing against accessing sensitive information entered into memory by a universal serial bus ("USB") input device.

2. Description of the Related Art

Securing a computer system involves preventing unauthorized access to sensitive data and/or instructions contained within various hardware resources attributed to that system. The terms "instructions" and "data" refer generically to all forms of electronic information, including data entries and files created by instructions as well as the executable instructions themselves.

Typically a computer system will include a plurality of hardware resources. Resources which can contain sensitive information include any and all peripheral devices connected to a peripheral bus as well as the system memory coupled to the processor bus. For example, system memory may include sensitive data or instructions against which access should be selectively prevented. The system memory is often denoted as semiconductor memory and includes a large contiguous address space often configured as DRAM or synchronous DRAM (SDRAM).

One mechanism used to secure a computer system is a technique known as password matching. For example, a password previously stored within non-volatile memory can be entered into volatile memory proximate to a comparator during reset or boot-up of the computer system. The previously stored password can then be compared against a user-entered password to determine if that user is allowed access. Typically, the volatile memory which receives the previously stored password, as well as a comparator locally linked to the volatile memory, are contained in what is often referred to as a "black box". Description of a black box security device is generally set forth in U.S. Pat. No. 5,748,888 (herein incorporated by reference).

The user-entered password can be entered by a hardware resource connected to the computer system via a universal serial bus ("USB"). A USB input device, e.g., USB keyboard is generally configured to receive the user-entered password and store that password within system memory before being transferred to the black box. Unfortunately, that user-entered password may remain within system memory even after it is called upon for verification. This implies that unauthorized users can gain access to the portion of system memory which contains the user-entered password. In so doing, an unauthorized user may gain access to and therefore breach the internal security of the computer system. Measures must be taken to prevent unauthorized access of the system memory, especially in situations where the user-entered password is input to the system memory from a USB input device, such as a USB keyboard.

Many modern computer systems employ a USB for several reasons. Such as, ubiquitous and inexpensive connectivity to existing serial lines, such as telephone, fax, and modem ports. The USB protocol has proved especially useful not only when connecting to existing bi-directional serial lines, but also as an overall expansion port to numerous hardware resources, such as keyboards, mice, etc. As such, USB proliferation is particularly acute is personal computer systems which depend on a rather simple, token scheduled protocol and which utilize a dynamic (or "hot") attachment and removal scheme.

The overall topography of a USB is that there is only one host, or host controller, located upon the USB. The host controller may be implemented in a combination of hardware, firmware, and/or software, and has a single attachment point for connecting to a hub or a function. The hub may be integrated within the host system to provide multiple attachment points therefrom.

A problem encountered by USB protocol, and related to the overall concern of maintaining system memory security, is that when a USB-coupled keyboard forwards password information, that information will be placed within system memory without regard to its security. Thus, the password within system memory can be retrieved by a "hacker" to compromise the security and integrity of not only the computer associated with that system memory, but many other computers networked thereto. Another problem associated with USB protocol is that after the USB host controller polls the USB keyboard for valid data resulting from a key being pressed upon the keyboard, the host controller temporarily places that data in a data buffer located within the host controller. Unauthorized access to that data buffer can occur prior to its transfer to system memory. It would therefore be desirable to introduce a USB host controller which can prevent unauthorized access to data and/or information entered onto the data buffer and/or system memory via the USB keyboard. It would be of further benefit to not modify in any way the existing USB protocol or the hardware associated with the USB host controller and/or USB devices (hubs and functions) connected to the USB host controller via the USB. Specifically, an improvement would be gained by implementing a security methodology which is seamless and transparent to the USB and computer system user.

SUMMARY OF THE INVENTION

The problems outlined above are in large part solved by an improved computer security system hereof. The security system encompasses a bus interface unit coupled between two peripheral buses. Preferably, one peripheral bus is a Peripheral Component Interface (PCI) bus, and the other peripheral bus is a Universal Serial Bus (USB). Any direct memory access (DMA) from a USB device to system memory is monitored by the bus interface unit and, more specifically, by a USB host controller within the bus interface unit. The USB host controller, hereinafter "host controller", is configured to receive a DMA cycle originating from a USB keyboard. If the DMA address is to a monitored address which is kept track of in the host controller, then a system management interrupt (SMI) will be issued by the host controller. Thus, the USB keyboard includes any input device which is coupled to a USB and which is adapted for entering sensitive information, such as passwords, etc. Accordingly, the USB keyboard can include, for example, a touch screen device, bar code scanner, or any device on which a user-entered password can be forwarded onto the USB.

Upon receiving information from the USB keyboard, determination is made on whether that information is secured depending on whether the address associated with that information (i.e., DMA address) is from a monitored target endpoint address. The target endpoint address is an address of a USB device coupled to the host controller via the USB, and wherein the target endpoint device being monitored is maintained in one or more registers within the host controller. If a match occurs, then a control unit within the host controller will issue a SMI signal to the processor. The processor will then switch to a separate operating environment contained within a system management RAM (or SMRAM). The SMRAM contains what is often noted as SMI handler code. At least one function of the SMI handler code is to transfer the secured, keyboard-entered information (i.e., information from a monitored target endpoint address of a USB device) to a specified location within system memory. That location is accessible only while SMI is asserted, or during system management mode (SMM). In this fashion, the password entered upon the keyboard is contained within a secured portion of system memory not accessible during normal operation of the computer system, and certainly not accessible to an unauthorized user who is not privy to the endpoint addresses stored within the target endpoint address registers. Not knowing those addresses, or how the registers are configured during boot-up, or during subsequent re-configuration via a USB "control packet", unauthorized access is not allowed—especially since all USB transfers, including control transfers, bulk transfers in general, isochronous transfers and interrupt transfers can be trapped to allow generation of an SMI which, in turn, protects any hardware resource against unwarranted intrusion.

The host controller is advantageously placed within a bus interface unit which links a USB and a PCI bus. A comparator is configured within the host controller to compare DMA addresses from USB devices with endpoint addresses stored within the target endpoint address registers. If a match exists, then a control unit within the host controller will issue an SMI, thereby initiating execution of the SMI handler code from, e.g., the SMRAM. In addition to the endpoint address registers, SMI control and status registers are present to indicate which USB device caused SMI to occur, and whether SMI occurs as a result of (i) a DMA address matching an address within the endpoint address register; or (ii) a control packet being sent by the host controller to indicate re-configuration of target endpoint addresses.

The host controller further includes a data buffer which temporarily stores the keyboard-entered, DMA-type data prior to placing that data upon system memory. An endpoint descriptor register and a transfer descriptor register keeps track of the current endpoint USB device which is performing the data transfer to the data buffer and the nature of that data transfer (e.g., the number of bytes being transferred).

According to one embodiment, a computer system is presented. The computer system includes a USB and a keyboard coupled to the USB. A host controller is coupled between the USB and memory (interchangeably known as system memory or semiconductor memory). The host controller includes a control unit which is operably configured to assert SMI and place information entered from the keyboard into a secured portion of the memory if the information entered from the keyboard is from a secured endpoint address stored within an endpoint address register of the host controller. The SMI handler code will therefore probe the USB and determine if the information entered upon the keyboard is from a monitored (or secured) endpoint address found within the endpoint address registers. A value within the endpoint address register corresponds to the secured endpoint address, and wherein that value can be modified if the host controller forwards an endpoint number 0 across a control pipe 0 of the USB.

Formed as part of the memory or separate from the memory is a comparator associated with the black box. The comparator compares the information entered from the keyboard with a previously entered password stored in non-volatile memory secured portion of the memory or another secured portion within non-volatile memory. If the comparison is favorable, an unlock condition exists whereby a secured peripheral device coupled within the computer system becomes accessible. A hard drive, input/output ports of a network interface card are but a few examples of peripheral devices which can be selectively secured.

According to another embodiment, a bus interface unit is presented. The bus interface unit is coupled between a USB and a PCI bus, and includes a USB host controller coupled to receive a DMA cycle initiated from a keyboard coupled to the USB and destined for system memory. The USB host controller may include a control unit which compares an address of a DMA cycle with a secured endpoint address stored within the host controller to determine if data of the DMA cycle is to be transferred to a secured portion of the system memory during times in which the USB host controller initiates SMI to a processor, and the SMI handler code polls for secured endpoint addresses. Data of the DMA cycle is temporarily stored in a data buffer within the USB host controller before being transferred to the secured portion. Sanitized data can be written to the data buffer as the DMA cycle is being transferred to the secured portion. The sanitized data is accessible during times in which SMI is no longer asserted. Thus, the sanitized data is not-secured data and merely serves to flush the data buffer of the password information, and further suffices to ensure future non-SMI transfers do not occur to the secured (i.e., SMI accessible) portion of system memory. Accordingly, the sanitized data represents any data dissimilar from the previously stored, secured data and the address associated therewith.

According to yet another embodiment, a method is provided for securing a DMA cycle having password information entered upon a computer system keyboard. The method includes initiating SMM operation if the DMA cycle is from a polled address of a USB keyboard device that matches an address stored in a USB host controller. Data associated with the DMA cycle is then stored into a data buffer and the stored data is then released from the data buffer to a portion of system memory via execution of SMI handler code.

BRIEF DESCRIPTION OF THE DRAWINGS

Other objects and advantages of the invention will become apparent upon reading the following detailed description and upon reference to the accompanying drawings in which.

Figure 1:
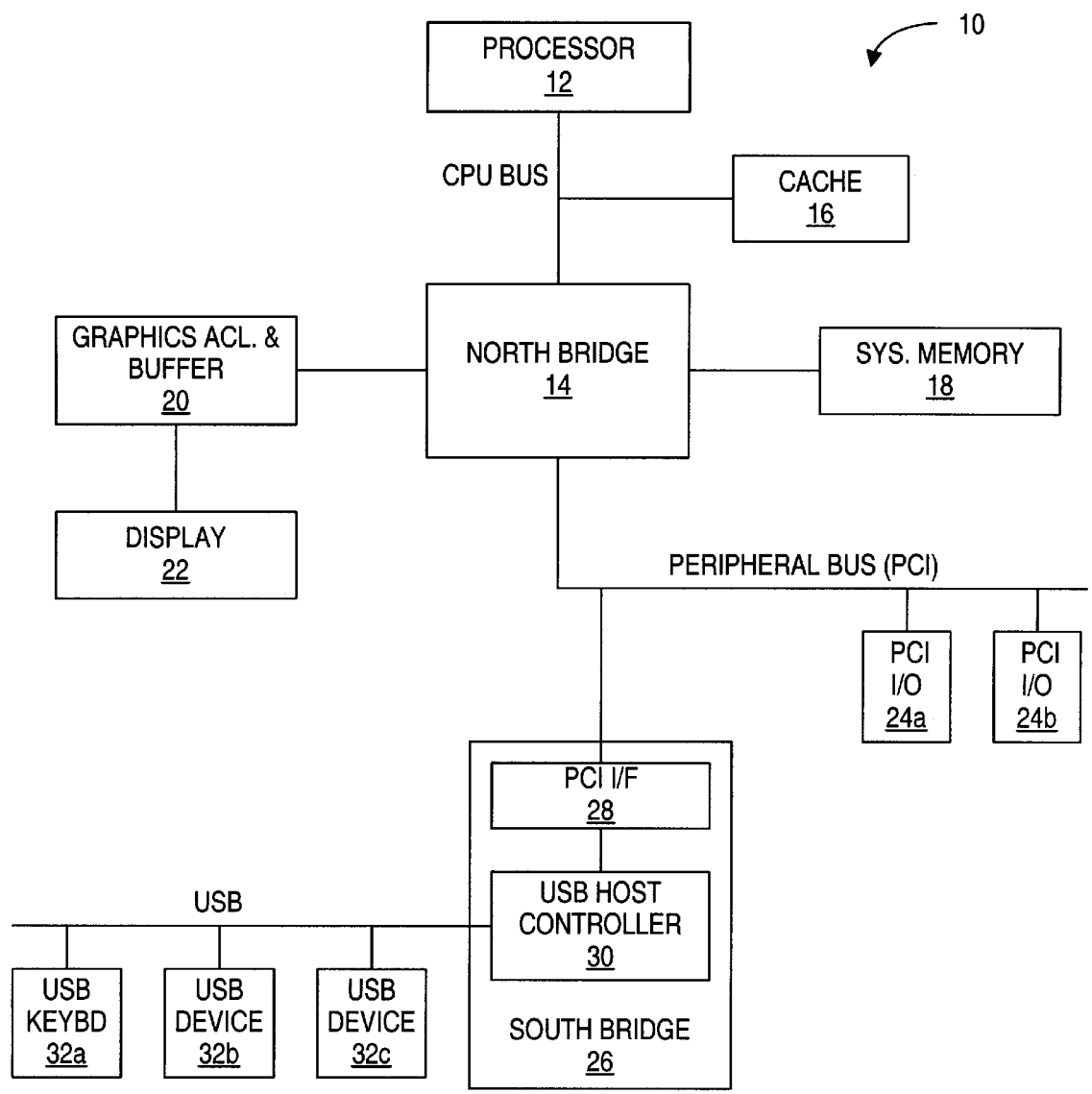
FIG. 1 is a block diagram of a computer system comprising various buses and bus interface units.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning to the drawings, FIG. 1 illustrates a computer 10 having multiple buses, including a CPU bus, a mezzanine or PCI bus, and multiple peripheral buses. In the example shown, the peripheral buses include an ISA/EISA bus, an IDE bus and a I$^2$C bus. The CPU bus connects a CPU or processor 12 to a bus interface unit or northbridge 14. A cache memory 16 can be embodied within or external to CPU 12.

Northbridge 14 provides an interface between components clocked at dissimilar rates. According to one embodiment, northbridge 14 interfaces a slower PCI bus and a faster CPU bus. Northbridge 14 may also contain a memory controller which allows communication to and from system memory 18. A suitable system memory 18 comprises DRAM or synchronous DRAM ("SDRAM"). Northbridge 14 may also include graphics support to allow communication to a graphics accelerator and buffer 20. A graphics support, included within an advanced graphics port such as the Accelerated Graphics Port (AGP), provides a high performance, component level interconnect targeted at three dimensional graphics display applications and is based on performance extensions or enhancements to PCI.

AGP interfaces are generally standard in the industry, the description of which is available from Intel Corporation. Generally speaking, AGP is physically, logically, and electrically independent of the PCI bus and is intended for the exclusive use of a display device 22. Display 22 is any electronic display upon which an image or text can be presented. A suitable display 22 includes a cathode ray tube (CRT), a liquid crystal display (LCD), etc.

Northbridge 14 is generally considered an application specific chip set, or application specific integrated circuit (ASIC) that provides connectivity to various buses, and integrates other system functions such as memory interface and P1394. System memory 18 is considered the main memory and refers to a portion of addressable memory that the majority of memory accesses target. System memory 18 is considered the largest continuous memory space of computer 10.

Northbridge 14 contains various sub-components, some of which serve as an interface to processor 12, system memory 18 and the graphics accelerator or frame buffer associated with display 22. A PCI interface is also included within northbridge 14 to allow accesses to and from input/output (I/O) devices 24 connected to the PCI bus.

Also connected to the PCI bus is a southbridge 26. Southbridge 26, similar to northbridge 14, contains various interfaces or controllers connected to respective buses. For example, a controller or interface exists within southbridge 26 to handle communications between devices on the PCI bus as well as the USB. Accordingly, southbridge 26 includes a PCI interface 28 and a USB interface, alternatively known as a USB host controller 30. The controller or interface unit serve to adapt transfer protocols from one bus to that of another. The interfaces also provide buffers to handle what could be substantially dissimilar transfer rates between those buses. Southbridge 26 can accommodate numerous buses, beyond the PCI bus and USB shown in FIG. 1.

USB host controller 30 operates according to well-known USB protocol. Specifically, each USB transaction begins when the host controller 30, on a scheduled basis, sends a packet describing the type of transfer, the USB device addressed, and an endpoint number. This packet is often referred to as the token packet. The USB device that is addressed selects itself by decoding the appropriate address fields. In a given transaction, data is transferred either from the host controller to a device or from a device to the host controller. The direction of data transfer is specified in the token packet. The source of the transfer then sends a data packet or indicates it has no data to transfer. The destination responds with a handshake packet indicating whether the transfer was successful.

In FIG. 1, USB devices are shown as reference numeral 32, one of which may be a password entry device or keyboard 32a. According to the USB data transfer model, transfers between a source or destination on a host and an endpoint on a device is referred to as a pipe. Pipes have associations of data bandwidth, transfer service type, and endpoint characteristics like directionality and buffer sizes. Pipes come into existence when a source or destination on host controller 30 requests access to an endpoint on the USB device 32. One message pipe, control pipe 0, always exists in order to provide access to the USB device configuration, status and control information. Thus, control pipe 0 indicates configuration of the USB device registers whenever an endpoint number 0 is designated to which the USB device control pipe 0 will be attached.

An overall description of the USB specification, relating to USB protocol, control packets, token packets, data packets, host controller, hubs, and function descriptions, endpoint descriptors, etc., are set forth in the Universal Serial Bus Specification.

Figure 2:
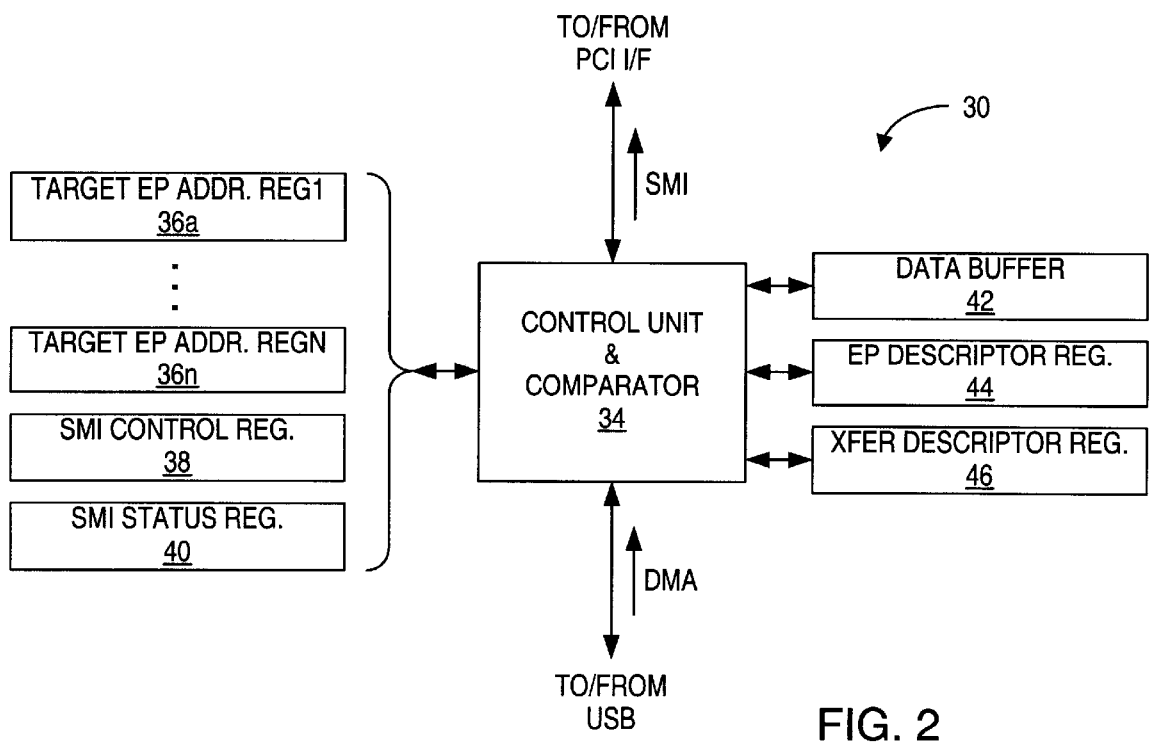
FIG. 2 is a block diagram of the USB host controller of FIG. 1 coupled between the PCI bus and the USB, wherein the USB host controller contains various host controller registers which track, inter alia, changes to target endpoint addresses of USB devices, when and why SMI is entered, the description of the USB device performing the data transfer as well as the characteristics of that transfer, and wherein the USB host controller further contains a buffer which temporarily retains secured USB keyboard-entered data and releases that data to system memory upon clearing the SMI status register by the SMI executable code.

Referring to FIG. 2, a block diagram of host controller 30 is shown. Host controller 30 includes a control unit and comparator 34, as well as a series of registers operably coupled to unit 34. Control unit 34 receives information from a USB device, such information being possibly in the form of a DMA transfer. Upon receiving a targeted address of the USB/DMA address location of the transfer, control unit 34 embodies a comparator which compares that address to addresses stored within a corresponding target endpoint address register 36. If a match occurs, indicating the DMA transfer is from a secured endpoint address, then the comparator will note a favorable comparison and the control unit will forward the transfer to data buffer 42 during execution of the SMI handler code.

In addition to registers 36, host controller 30 includes an SMI control register and an SMI status register 38 and 40, respectively. For example, registers 38 and 40 include at least two bits. One bit within register 40 may be used to indicate change to the endpoint address triggered by receipt of a control packet signaled by endpoint number 0 upon control pipe 0, whereas the other bit may be used to indicate the data associated with the DMA transfer is to a monitored endpoint address. In either instance, the SMI handler code polls the endpoint addresses and notation is made via executable SMI handler code as to what caused the SMI and that notation is provided within registers 38 and 40.

The data received from the keyboard, by virtue of a DMA transfer, is forwarded to a data buffer 42. The USB device and the endpoint number associated with that device which sourced the DMA transfer is noted within an endpoint descriptor register 44. The transfer characteristics and, more specifically, the size of data being transferred is stored within transfer descriptor register 46. Thus, if two bytes are transferred and stored within data buffer 42, the number of bytes transferred are noted within register 46.

Figure 3:
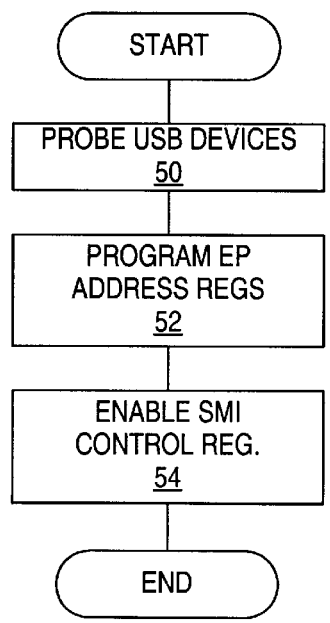
FIG. 3 is a flow diagram of logical operations which occur within the USB host controller of FIG. 2 during initiation, reset or boot-up of the computer system, as well as during re-configuration of the endpoint address registers when a control packet is encountered.

Referring to FIG. 3, the host controller contains firmware or software used to initialize target endpoint address registers. Information within those registers can be initially established during boot-up of the computer system through, for example, the BIOS routine, where contents of the registers are established based on configuration information within each USB device. Thereafter, the contents can be changed during execution of the SMI handler code which serves to probe the USB devices and determine which endpoints associated with those devices are to be monitored for secure data. Those endpoints will primarily be associated with the USB keyboard. Addresses associated with the secured endpoints will be stored in the target endpoint address registers shown in FIG. 2. Probing of the USB devices is indicated as reference numeral 50 in FIG. 3. Programming the endpoint address registers with the addresses of USB devices whose endpoints are to be monitored, is shown as reference numeral 52. Once the address registers are configured with to-be-monitored endpoint addresses, then the SMI control register 38 (shown in FIG. 2) is enabled, as shown by reference numeral 54. Enabling the SMI control register ensures that when a subsequent DMA transfer to a monitored endpoint address occurs, SMI handler code will take appropriate action.

Figure 4:
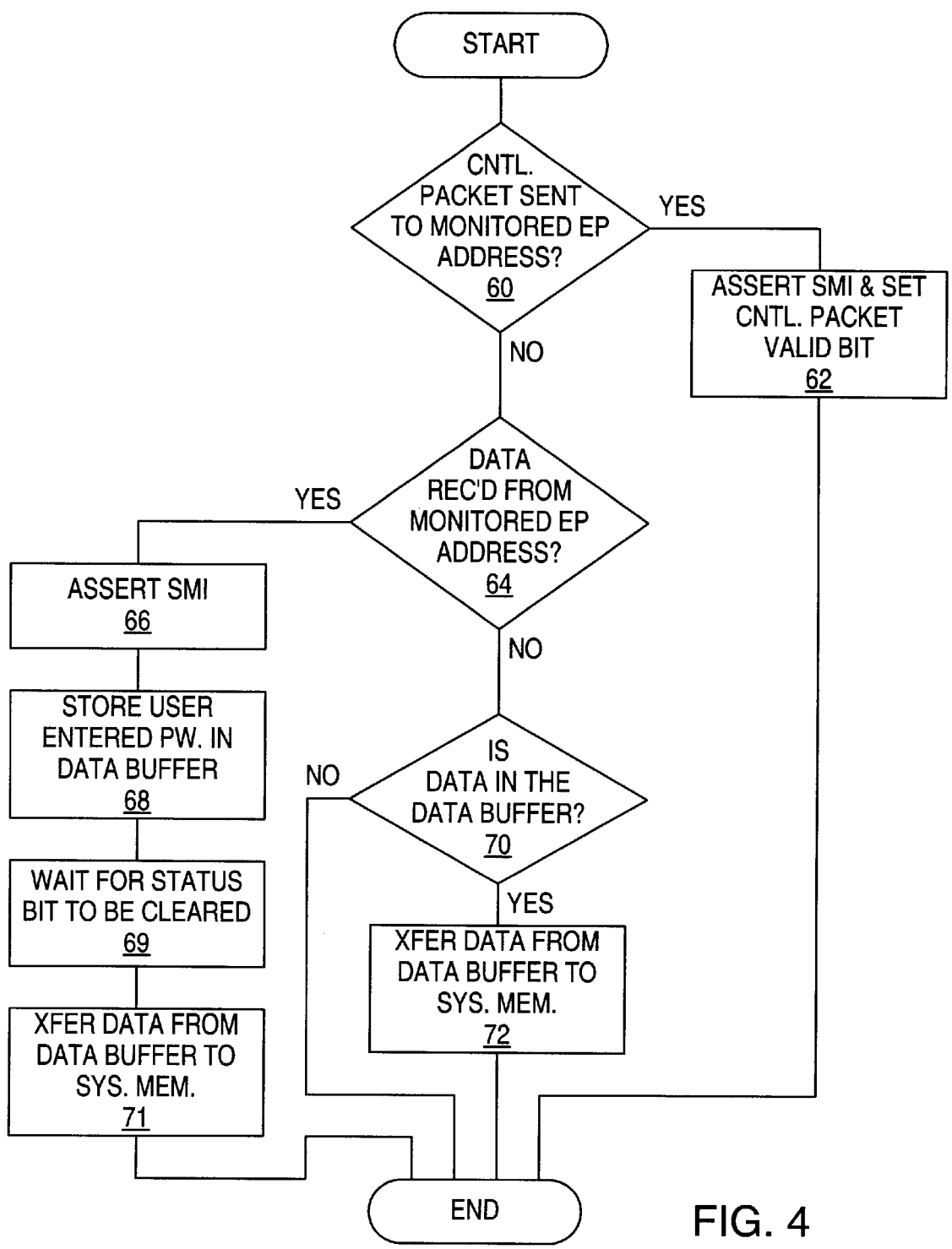
FIG. 4 is a flow diagram of logical operations undertaken by the USB host controller of FIG. 2 to assert SMI and change a monitored target endpoint addresses, as well as storing data to a data buffer within the USB host controller whenever that data is received from a monitored target endpoint address corresponding to a secured USB keyboard-entered data.

FIG. 4 illustrates hardware, software and/or firmware attributed to the host controller, necessary for indicating conditions in which an SMI is asserted. First, the host controller must determine if a control packet is sent to a monitored endpoint address 60. The control packet is known as being one which involves endpoint number 0 and an associated control pipe 0. If the host controller has indeed forwarded a control packet, then SMI is asserted and the control packet valid bit is set within the SMI status register, as indicated by step 62. It is noted that the host controller will monitor control transfers involving endpoint number 0, but the host controller is not limited solely to SMI assertion from a control packet. SMI can originate from, for example, any USB transfer which can be trapped: a general bulk transfer, an isochronous transfer or even an interrupt can suffice. Asserting SMI allows the SMI handler code to re-configure the target addresses attributed to the USB device issuing the "trapped" packet as well as updating the associated target endpoint address register within the host controller. In this fashion, any change to a monitored, target address will be reflected and updated within the target endpoint address registers.

Using a control packet example of a trapped transfer, if the control packet is not sent, then determination must be made on whether data is received from a monitored endpoint address attributed to a target endpoint device. That determination is shown as decision 64. If data has been sent from a monitored endpoint address, then SMI is (or remains) asserted, as shown by step 66. Given that SMI is asserted, the user-entered password attributed to the DMA transfer is entered into the data buffer (shown in FIG. 2), as indicated by step 68. If data was received by the data buffer, then the controller must wait until a status bit is cleared 69 before sending the data from the data buffer to system memory, as shown by step 71. The status bit will not only cause an SMI, but would also prevent the host controller from transferring that data to system memory. The SMI code will then read the data out of the buffer, execute upon that data, and write sanitized data back before it clear the status bit which would then allow the host controller to continue with writing data to system memory.

Decision block 70 illustrations a decision being made on whether data is within the data buffer. If so, then data will be transferred by the SMI handler code, as shown by step 72. The host controller will, however, always store data from a USB transfer into its data buffer, regardless of the state of the data buffer valid bit. The data buffer valid bit will, however, cause an SMI to be generated and thereby prohibits the controller from sending the data to memory. If data being transferred is not attributed to a monitored endpoint address, then the data buffer valid bit will prevent that data from being placed within a secured portion of system memory accessible only through the SMI handler code. Thus, that data transfer is not secured and is accessible outside the protected SMM execution range. The host controller does not transfer data into any portion of memory. Instead the data buffer is available as a PCI target device only when in SMI mode for reading the data and writing sanitized data. If the secure data is placed in a secure portion of system memory, it because SMI code read it and placed it there. When the data buffer valid bit is cleared by the SMI code, the controller will then transfer the data in the data buffer to the normal location in memory.

Figure 5:
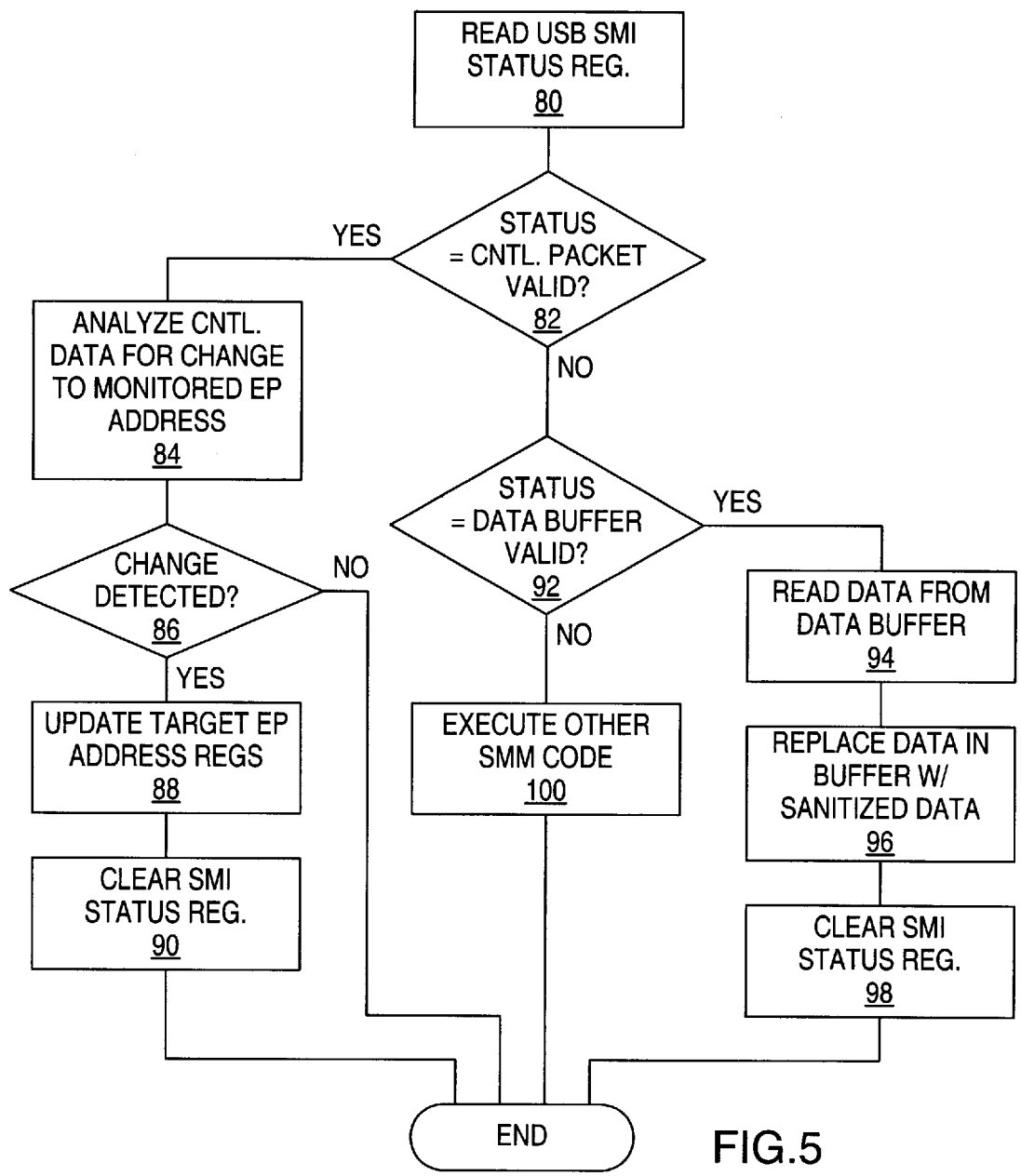
FIG. 5 is a flow diagram of SMI code for updating a target endpoint address within the target endpoint address register or transferring USB keyboard-entered data stored within the USB host controller data buffer to a secured location within system memory.

FIG. 5 illustrates a program flow associated with the SMI handler code. More specifically, the SMI handler code responds based upon the status of the SMI status register, and therefore involves reading that status register 80. If the status register indicates a control packet valid bit being set 82, then the control data attributed to the control packet is analyzed to determine if the endpoint address will be changed 84. If a change to the endpoint address of the USB device is detected 86, then the target endpoint address registers within the host controller are updated 88. Accordingly, the control data will contain information as to the USB device endpoint address change. The control data therefore is sent according to the well-known USB protocol involving endpoint number 0 and control pipe 0. Once the target endpoint address registers are updated, then the SMI status register can be cleared to indicate termination of SMI to the processor, as shown by reference numeral 90.

If the SMI status register does not indicate a control packet valid bit, then the SMI handler code will check to see if the SMI status register indicates a data buffer valid bit being set, as indicated by reference numeral 92. If so, then data will be read from the data buffer 94, yet that data will not be placed in system memory until the SMI status register is cleared, as indicated by block 98. That data within the data buffer will be replaced with what is known as "sanitized" data 96. Sanitized data is any data which is dissimilar from the secured data within the data buffer, and involves simply writing that sanitized data to the data buffer in order to flush the secured data therefrom. It is not until the SMI status register data buffer valid bit is cleared by the SMI handler code as shown by block 98, will the data be transferred from the data buffer to system memory. The sanitized data remaining within the data buffer merely maintains coherency as to the previous keyboard entry and aids in making the data transfer appear transparent to the USB host controller as well as the PCI transfer cycle to system memory.

Accordingly, any control data packets sent across the USB will be snarfed and monitored by the SMI handler code to allow addresses of the devices monitored in the target endpoint address registers to be modified. If they are modified, the target endpoint address registers are updated accordingly. If both the control packet valid bit and the data buffer valid bit are not set (indicating no changes to the target endpoint address or data read to a monitored target endpoint address), then the SMI handler code will merely execute other SMI handler code not attributed to the protected USB transfer protocol hereof Execution of other SMM code is shown by block 100.

It would be appreciated to those skilled in the art having the benefit of this disclosure, that the embodiments described herein are believed capable of securing passwords entered upon a USB keyboard without involving modifications to the USB host controller interface or the USB protocol. Provided the target endpoint address registers can be modified through a control packet sent from the host controller and data from the target endpoint addresses monitored for instituting an SMI handler code, various modifications and changes may be made to the present handler code, provided those modifications would be obvious to a person skilled in the art after having understood this disclosure. The SMI handler code will be launched under conditions described above, and transfers will occur by virtue of that code, with one important modification being that data forwarded to the data buffer be sanitized after the to-be-secured keyboard data is read from the data buffer. Accordingly, the present host controller can achieve a secure run-time password extraction to system memory by involving the SMI handler code accessing a protected or secured portion of system memory.

What is claimed is:

1. A computer system, comprising:
   a universal serial bus (USB);
   a plurality of input devices coupled to the USB; and
   a host controller coupled between the USB and memory, wherein the host controller comprises a control unit which is operably configured to assert a system management interrupt (SMI) for placing information entered from a first input device of the plurality of input devices into a secured portion of the memory if the information entered from the first input device is from a secured endpoint address stored within the host controller;
      wherein the host controller further comprises an SMI control register and a status register for indicating the first input device from among the plurality of input devices; and
      wherein the host controller comprises an endpoint descriptor register and a transfer descriptor register which keeps track of the number of bytes of information being entered by the first input device.

2. The computer as recited in claim 1, wherein the host controller comprises a target endpoint address register coupled to the control unit for receiving the secured endpoint address.

3. The computer as recited in claim 2, wherein a value within the target endpoint address register corresponds to the secured endpoint address and wherein the value is modified if the host controller forwards an endpoint number zero across a control pipe zero of the USB.

4. The computer as recited in claim 1, further comprising a processor operably linked to the memory and coupled to receive the SMI from the control unit.

5. The computer as recited in claim 1, wherein the memory comprises a comparator which compares the information entered from the first input device with a previously entered password stored within the secured portion of the memory and, if the comparison is favorable, to unlock a secured peripheral device coupled within the computer system.

6. The computer as recited in claim 5, wherein the secured peripheral device is operably linked to the PCI bus or the USB.

7. The computer as recited in claim 1, wherein the secured portion of the memory is initially accessible only during times in which SMI is asserted.

8. The computer as recited in claim 1, wherein the host controller comprises a data buffer coupled to receive the first input device information and forward the first input device information to the memory.

9. The computer as recited in claim 1, wherein the first input device is a keyboard, and wherein the secured endpoint address comprises an address of a keyboard entry upon the keyboard which triggers entry of the SMI and a program associated with a system management mode (SMM) initiated by the SMI.

10. The computer as recited in claim 9, wherein the program comprises code which accesses the secured portion of the memory.

11. A bus interface unit coupled between a universal serial bus (USB) and a peripheral component interface (PCI) bus, the bus interface unit comprising:
    a USB host controller coupled to receive a direct memory access (DMA) cycle initiated from a plurality of input devices, one of which is a keyboard coupled to the USB and destined for system memory;
       wherein the USB host controller comprises a control unit which compares an address of the DMA cycle with a secured endpoint address stored within the host controller to determine if data of the DMA cycle is to be transferred to a secured portion of the system memory during times in which the USB host controller initiates a system management interrupt (SMI) to a processor operably coupled to the PCI bus;
       wherein the host controller further comprises an SMI control register and a status register for indicating the keyboard from among the plurality of input devices; and
       wherein the host controller comprises an endpoint descriptor register and a transfer descriptor register which keeps track of the number of bytes of information being entered by the keyboard.

12. The bus interface unit as recited in claim 11, wherein the USB host controller comprises a target address register coupled to the control unit for receiving the secured endpoint address.

13. The bus interface unit as recited in claim 12, wherein a target endpoint address register is coupled to the control unit for storing the secured endpoint address, and wherein a value within the target endpoint address register is modified if the host controller forwards an endpoint number zero across control pipe zero of the USB.

14. The bus interface unit as recited in claim 13, wherein the DMA cycle comprises secured data if an address of the DMA cycle favorably compares to the secured endpoint address stored within the target address register.

15. The bus interface unit as recited in claim 11, wherein data of the DMA cycle is temporarily stored in a data buffer within the USB host controller before being transferred to the secured portion.

16. The bus interface unit as recited in claim 1, wherein sanitized data is written to the data buffer as the DMA cycle is being transferred to the secured portion, and wherein the sanitized data within the data buffer is accessible during times in which the system management interrupt is no longer asserted.

17. A method for securing a direct memory access (DMA) cycle having password information entered upon a computer system keyboard, comprising:

initiating system management mode (SMM) operation if an address of the DMA cycle initiated from the keyboard matches an address stored in a universal serial bus (USB) host controller;

storing data associated with the DMA cycle into a data buffer and releasing the stored data from the data buffer to a portion of computer system memory during the SMM operation;

reading bits within an SMI control register and a status register for indicating the keyboard from among a plurality of input devices coupled to the USB; and reading bits within an endpoint descriptor register and a transfer descriptor register for keeping track of the number of bates of information being entered by the keyboard.

18. The method as recited in claim 17, wherein said initiating comprises forwarding a system management interrupt (SMI) signal to a processor operably coupled to the computer system memory and maintaining the SMI signal until after the data has been released from the data buffer.

19. The method as recited in claim 17, wherein said storing comprises replacing the stored data within the data buffer with non-secured data.

20. The method as recited in claim 17, further comprising re-configuring a target endpoint address register within the host controller with another address when a control packet is sent from the USB host controller across a universal serial bus (USB) and to a USB device coupled to the USB.

* * * * *

UNITED STATES PATENT AND TRADEMARK OFFICE
CERTIFICATE OF CORRECTION

PATENT NO. : 6,216,183 B1
DATED : April 10, 2001
INVENTOR(S) : Rawlins

It is certified that error appears in the above-identified patent and that said Letters Patent is hereby corrected as shown below:

Claims:
Column 11,
Line 9, after the phrase "as recited in claim" please delete the number "1" and substitute therefor -- 15 --.

Column 12,
Line 8, after the phrase "number of" please delete the word "bates" and substitute therefor -- bytes --.

Signed and Sealed this

Twenty-eighth Day of August, 2001

Attest:

*Nicholas P. Godici*

NICHOLAS P. GODICI
*Attesting Officer*  *Acting Director of the United States Patent and Trademark Office*